(No Model.) 8 Sheets—Sheet 1.

G. & J. H. TAYLOR.
MACHINE FOR ORNAMENTING STRIPS OF FABRIC.

No. 376,995. Patented Jan. 24, 1888.

WITNESSES:

INVENTORS
G. and J. H. Taylor
BY
their ATTORNEY (No Model.) 8 Sheets—Sheet 3.

G. & J. H. TAYLOR.
MACHINE FOR ORNAMENTING STRIPS OF FABRIC.

No. 376,995. Patented Jan. 24, 1888.

WITNESSES:
C. W. Benjamin
Joseph L. Levy

INVENTORS
G. and J. H. Taylor
BY
Henry L. Brevoort
their ATTORNEY (No Model.)

G. & J. H. TAYLOR.
MACHINE FOR ORNAMENTING STRIPS OF FABRIC.

No. 376,995. Patented Jan. 24, 1888.

WITNESSES:
C. W. Benjamin
Joseph L. Levy

INVENTORS
G. and J. H. Taylor.
BY
Henry L. Brevoort
their ATTORNEY (No Model.) 8 Sheets—Sheet 5.

G. & J. H. TAYLOR.
MACHINE FOR ORNAMENTING STRIPS OF FABRIC.

No. 376,995. Patented Jan. 24, 1888.

WITNESSES:
C. W. Benjamin
Joseph L. Levy

INVENTORS
G. and J. H. Taylor
BY Henry L. Brevoort
their ATTORNEY (No Model.) 8 Sheets—Sheet 6.

G. & J. H. TAYLOR.
MACHINE FOR ORNAMENTING STRIPS OF FABRIC.

No. 376,995. Patented Jan. 24, 1888.

WITNESSES:

INVENTORS.
G. and J. H. Taylor
BY
their ATTORNEY (No Model.)  8 Sheets—Sheet 7.

G. &. J. H. TAYLOR.
MACHINE FOR ORNAMENTING STRIPS OF FABRIC.

No. 376,995. Patented Jan. 24, 1888.

WITNESSES:
C. W. Benjamin
Joseph L. Levy

INVENTORS
G. and J. H. Taylor
BY
Henry L. Brevoort
their ATTORNEY

UNITED STATES PATENT OFFICE.

GEORGE TAYLOR AND JAMES H. TAYLOR, OF NOTTINGHAM, COUNTY OF NOTTINGHAM, ENGLAND, ASSIGNORS TO ALEXANDER E. KURSHEEDT, OF NEW YORK, N. Y.

MACHINE FOR ORNAMENTING STRIPS OF FABRIC.

SPECIFICATION forming part of Letters Patent No. 376,995, dated January 24, 1888.

Application filed December 30, 1886. Serial No. 222,992. (No model.)

*To all whom it may concern:*

Be it known that we, GEORGE TAYLOR, residing at 245 Great Alfred Street, Nottingham, in the county of Nottingham, England, and JAMES HENRY TAYLOR, residing at 16 Gladstone Street, Nottingham, in the county of Nottingham, and subjects of the Queen of Great Britain and Ireland, have invented certain new and useful Improvements in Machines for Ornamenting Strips of Fabric; and we do hereby declare that the following is a full and exact description thereof.

Our invention relates to machines for producing upon the margin or margins of a strip of fabric which has previously been plaited or crimped bends, waves, scallops, or folds which make the strip ornamental and suitable for the purpose of a trimming, ruching, or the like. As the bends or waves, which it is the object of the present machine to form, require extra material to enable them to be produced, it is necessary to use a strip which has been previously crimped or plaited, and thus in the operation of the machine to be described material is provided for the bends or waves by pulling out the previously-formed crimps or plaits.

We have already taken out a patent, No. 342,479, for a machine for producing waves in a strip of fabric, and we make no claim to anything there shown.

Figure 1:
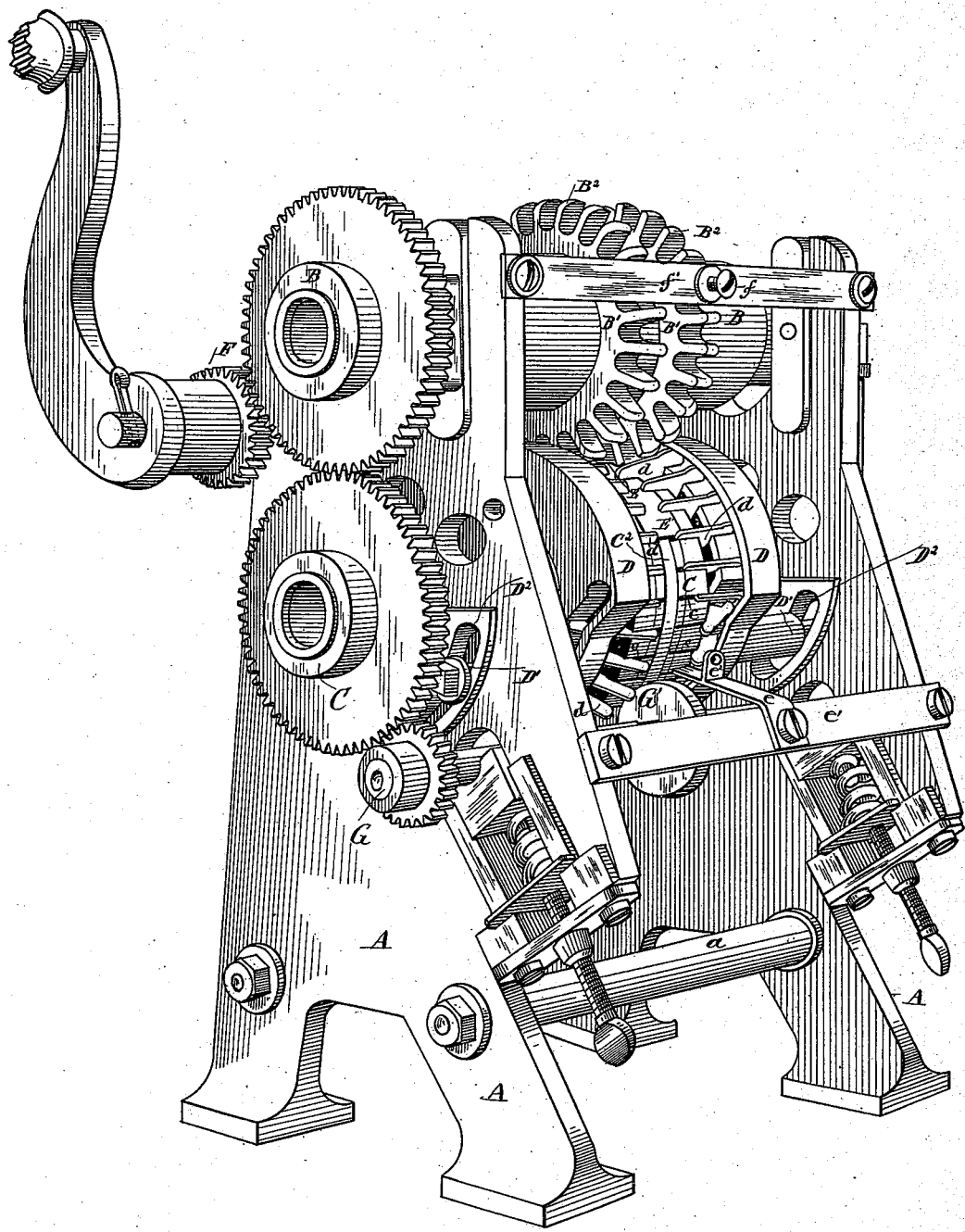
Figure 2:
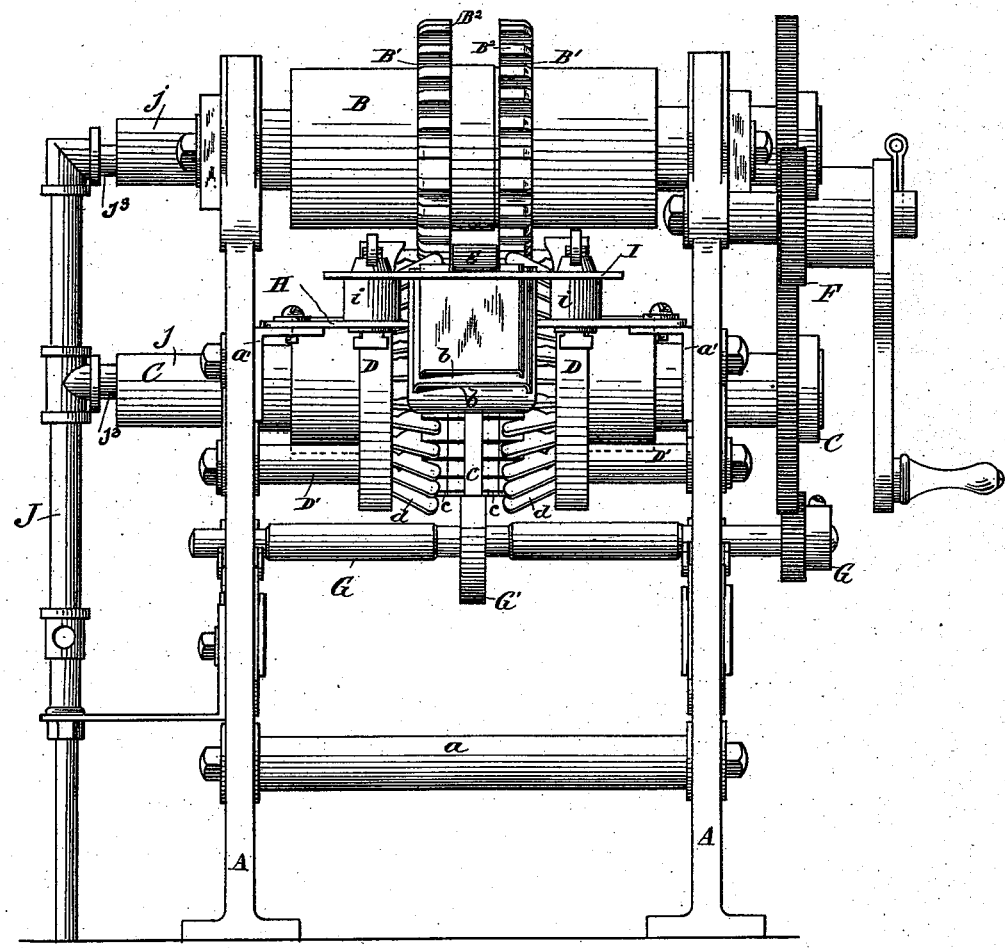
Figure 3:
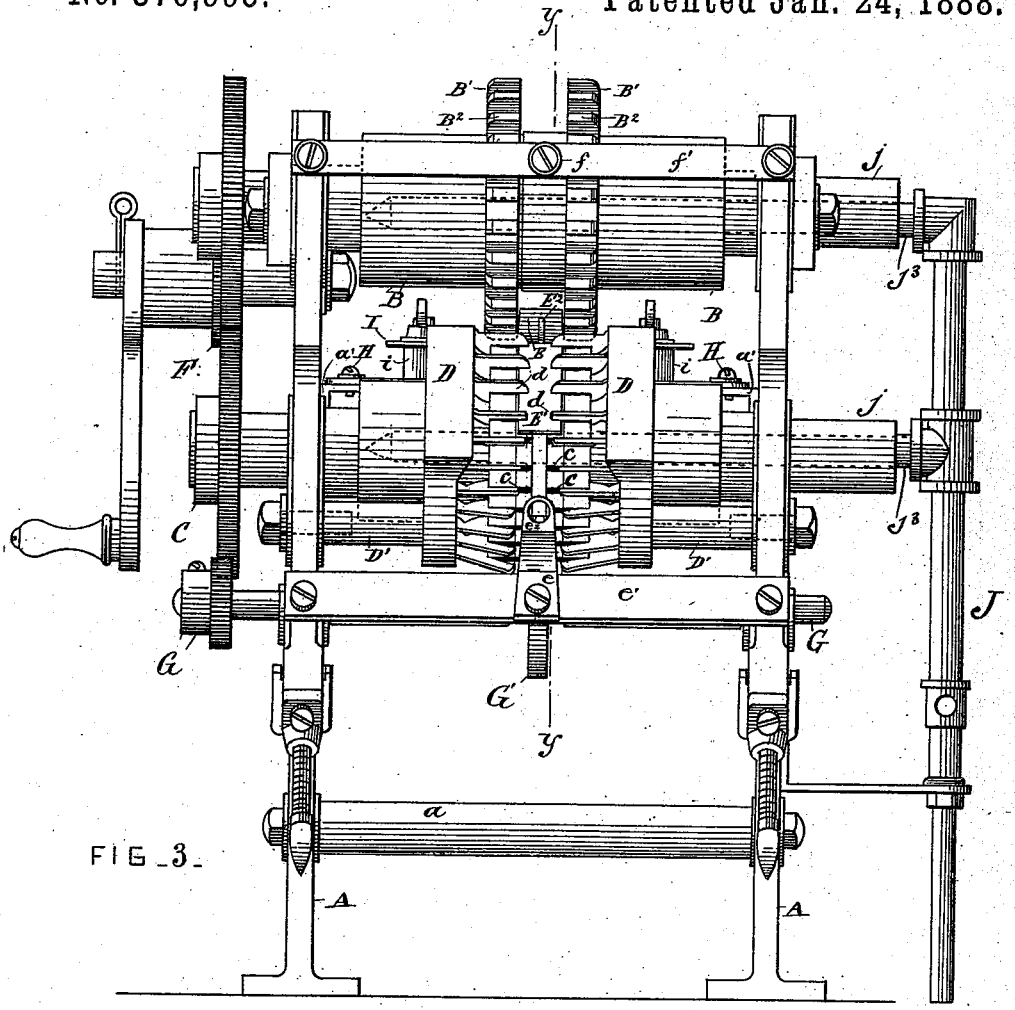
Figure 6:
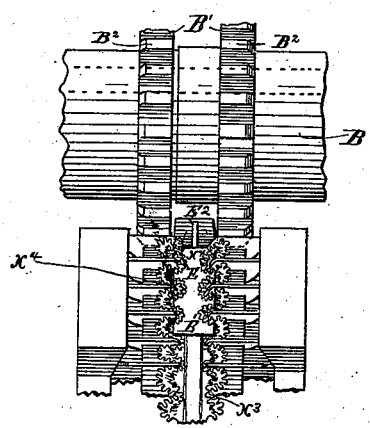
Figure 4:
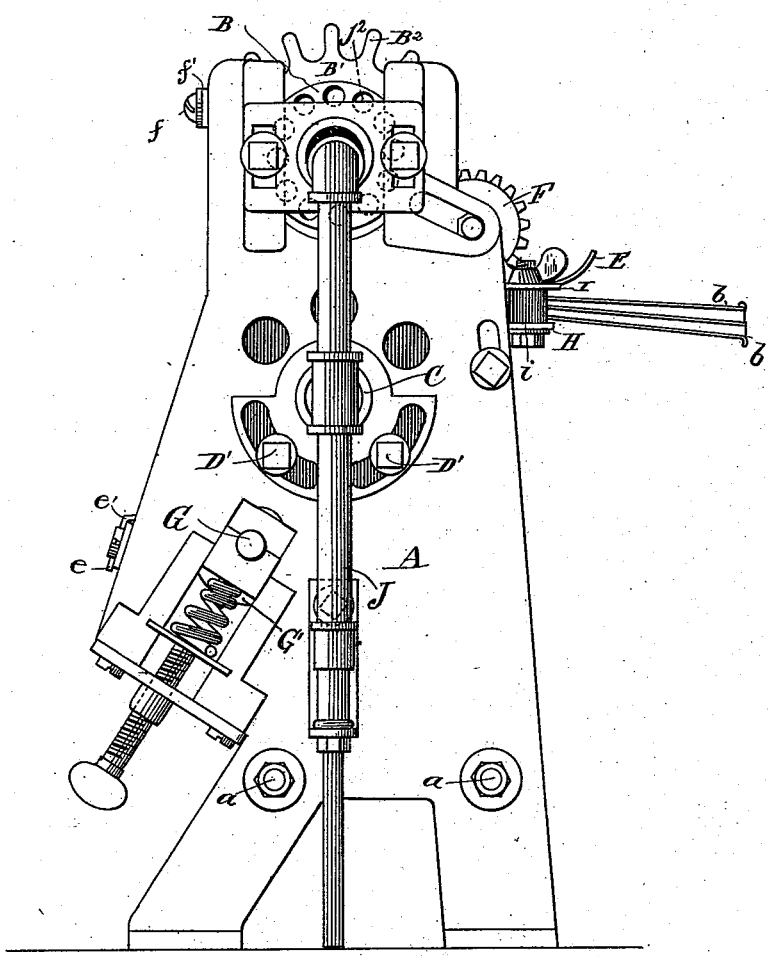
Figure 5:
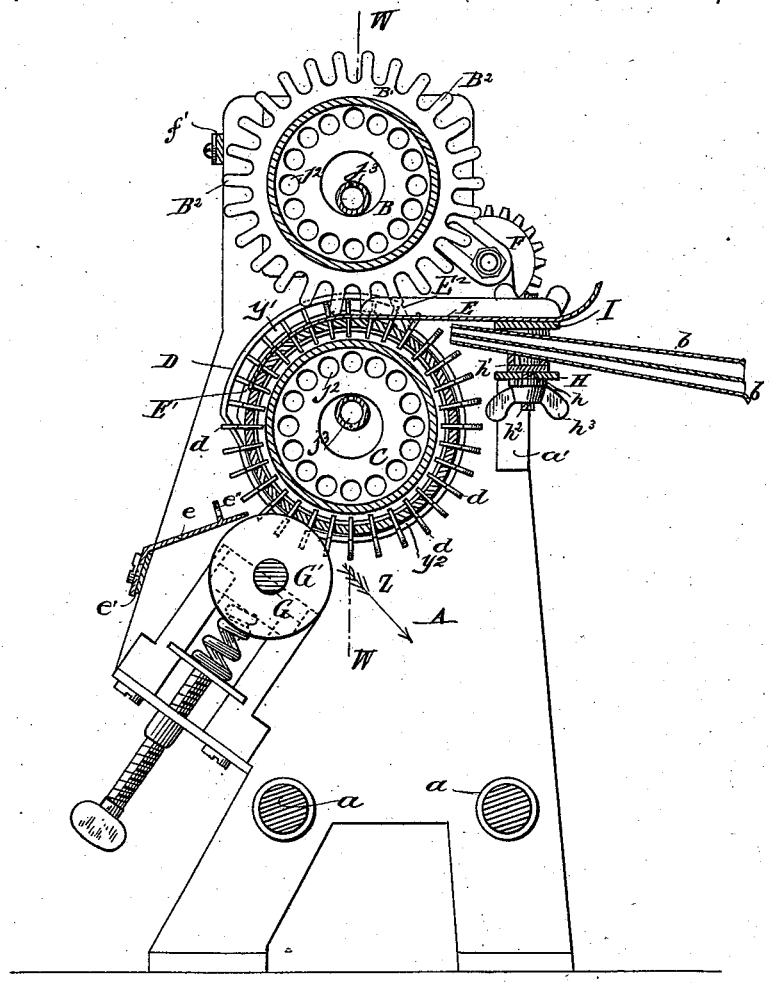
Figure 7:
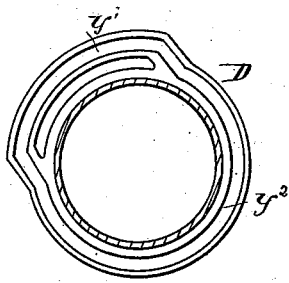
Figure 8:
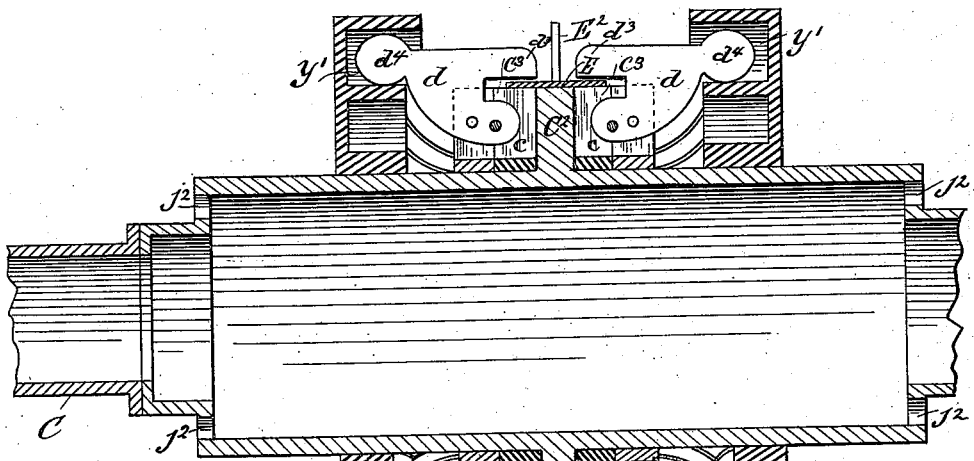
Figure 9:
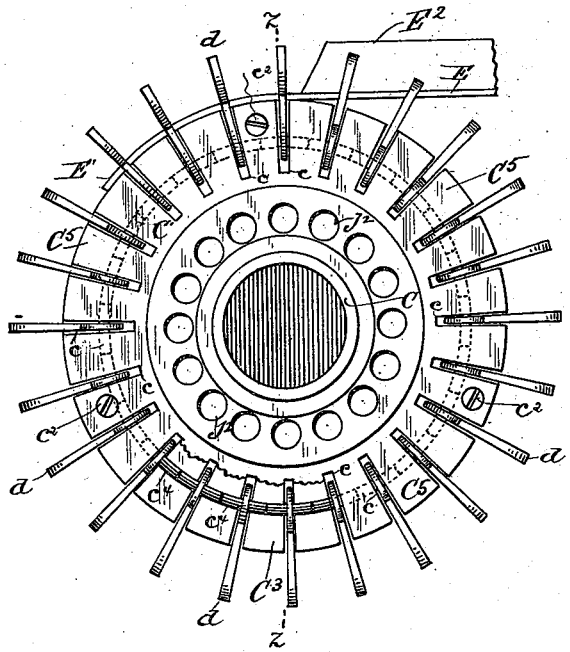
Figure 10:
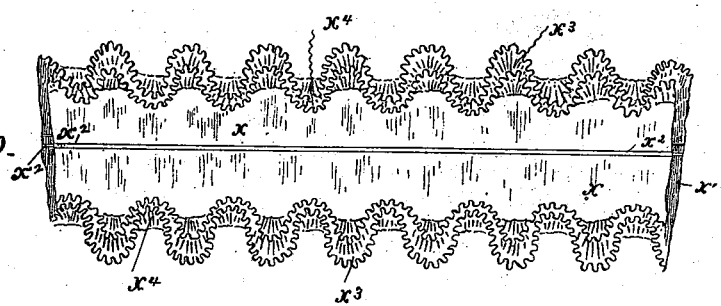
Figure 11:
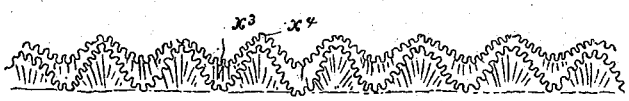

In the accompanying drawings, Figure 1 is a perspective view. Fig. 2 is a front elevation. Fig. 3 is a rear elevation. Fig. 4 is a side elevation. Fig. 5 is a vertical section on the plane Y Y in Fig. 3. Fig. 6 is a front elevation of parts of the mechanism, showing the production of the bends or waves. Fig. 7 is a side elevation of one of the stationary cams. Fig. 8 is a longitudinal section of the lower cylinder, taken on the line $w\,w$, Fig. 5. Fig. 9 is a side elevation of the same. Fig. 10 is a plan view. Fig. 11 is a side elevation, and Fig. 12 an end elevation, of the goods produced by the machine. Fig. 13 is a side elevation, partly in section, showing a modification of the folding device upon which the goods are folded.

Similar letters refer to similar parts throughout the several views.

Figure 12:
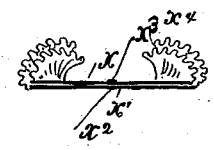
Figure 13:
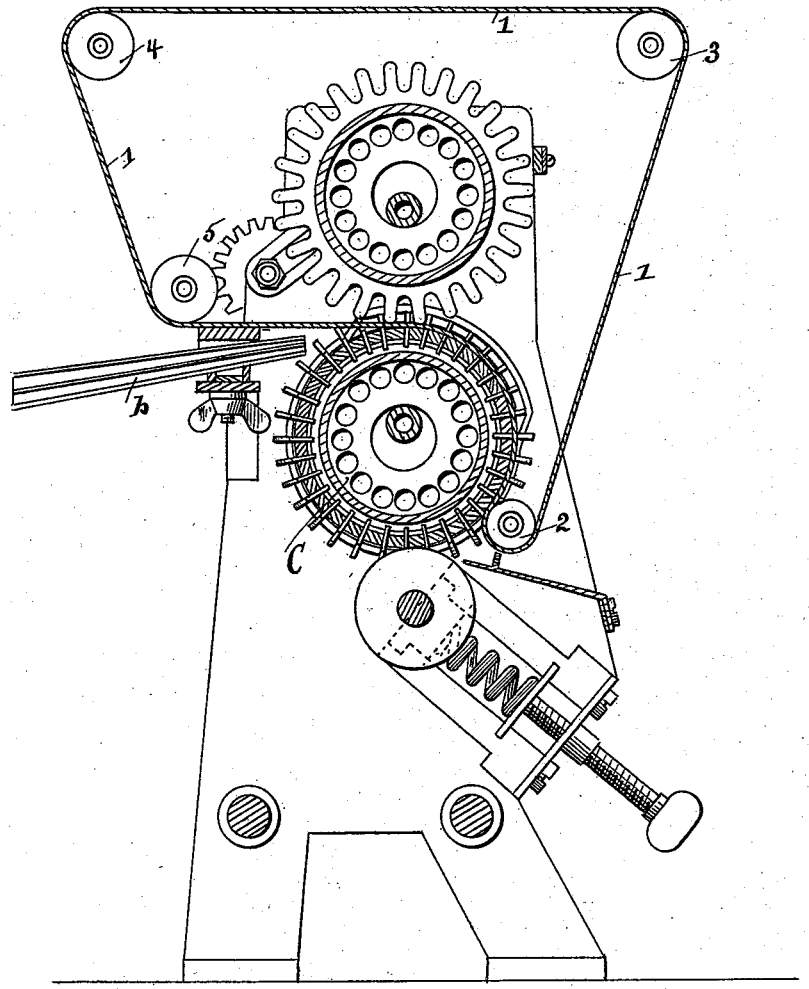

We will first refer to Figs. 10, 11, and 12, which show the goods produced by the machine to be described.

One, two, or three strips may have their edge or edges ornamented by the machine. The strips are previously crimped or plaited. If more than one strip is used, the strips are superimposed. During the operation and subsequently they may be kept in the superimposed condition, or they may eventually be separated.

Fig. 10 shows a top view of the goods, Fig. 11 a side view, and Fig. 12 an end view in cross section. Two strips are shown at X and X' superimposed, and both edges are shown as ornamented. The strips at their edges are bent into scallops, waves, or folds, being intermittently bent upward as at $X^4$, and between such bends, as at $X^3$, the goods are kept nearly on a plane with the central portion. In this way scallops or waves are formed upon one or both margins of the goods. At $X^2\,X^2$ gum-cords are shown pressed upon the surface of the goods and made adherent thereto by a suitable substance.

We will now describe our machine for producing the goods shown in Figs. 10, 11, and 12, it being understood that plaited or crimped strips are to be treated by the machine.

A A are two frames or standards rigidly attached to each other by cross-bars $a\,a$, the standards supporting the operative parts of the mechanism.

At the upper part of the frame is journaled a cylinder, B, upon which are two presser-wheels, B' B', with radial pressers $B^2\,B^2$, which in the operation of the machine press upon the goods at the point indicated by $X^3\,X^3$, Fig. 10, thus preventing such portion of the goods from being bent upward and inward, as at $X^4$, the radial pressers intermittently pressing or holding down those portions of the margin or margins of the goods which are marked $X^3$. Below the cylinder B and its radial pressers $B^2$ is arranged another cylinder, C, supported by the framing. This cylinder is best shown in Fig. 8, where it is represented full size and in longitudinal section. This cylinder has a central flange, $C^2$, and on each side of this flange the surface is built up level with the flange by four rings, which serve two functions, to wit: that of forming a surface for the goods to lie upon and that of carrying the pivots of the folding-fingers which act upon the goods in a manner subsequently to be described.

We will now describe the folding fingers $d$ and their method of attachment to the cylinder C.

On each side of the flange $C^2$ a ring, $C^3$, is placed. This ring is cut with—say twenty-four—radial slots $c$, and on the outer face of the ring a groove is turned. The folding-fingers $d$, as shown, have pivots inserted in them, (shown in Figs. 8 and 9 at $c^4$ $c^4$,) and these pivots may either be inserted in the holes $d'$ or $d^2$ of the fingers for the purpose of making narrower or wider folds or trimmings. When the pivots $c^4$ of the folding-fingers $d$ are located in the holes $d^2$ instead of the hole $d'$ for the purpose of producing narrower or deeper folds, the cams D, later to be described, are to be adjusted by means of the nuts and washers at the ends of the arms $D'$ in toward the center of the machine. The pivots $c^4$ of the folding-fingers $d$ are placed in the groove in the ring $C^3$, part of each finger being in the appropriate radial slot $c$, as shown. Two other rings, $C^5$ $C^5$, are then slipped upon the cylinder C. These rings are provided with radial slots to correspond with those in the rings $C^3$ $C^3$. These two additional rings, $C^5$ $C^5$, confine the fingers $d$ by their pivots $c^4$, so that the fingers may turn about the pivots and be free to move within the slots.

Screws $c^2$ confine the rings in position together. The screws also may enter the central flange, $C^2$, of the cylinder C, and thus hold all the rings firmly together. Each folding-finger $d$ has a projection or operative end $d^3$, and another projection $d^4$, which enters into the groove of the cam D, which cam controls the position of the fingers while they are being carried around with the cylinder C. While we are detailing the construction of the cylinder C and its attached parts, we will refer to Fig. 5, where a slightly-different arrangement has been shown for pivoting the fingers; but, as we prefer the plan as shown in Figs. 8 and 9, it will be unnecessary to describe the details of the pivoting shown in Fig. 5.

We will now turn to the cams D D, which control the operation of the folding-fingers while they are being carried around with the cylinder C.

The face of one of the cams is shown in Fig. 7 and in cross-section in Fig. 8. The cam is fastened to the frame of the machine by arms or supports $D'$. These arms $D'$ pass through the frames A in the slot $D^2$, and are adjustable therein, so that the cam may be rotated and clamped in any desired position circumferentially. The cam-groove is made up of the parts $y'$ and $y^2$. When the folding-fingers $d$ are in the position shown in the upper part of Fig. 8, the ends $d^4$ of the fingers are then in the part $y'$ of the cam. When the fingers are in the position shown in the lower part of Fig. 8, then their ends $d^4$ are in the part $y^2$ of the cam. Thus as the cylinder C rotates and carries the fingers with it, these fingers at their operative ends $d^3$ $d^3$ are caused to approach to and recede from the operative surface of the cylinder C. By the operative surface of the cylinder C we refer to that surface which is made up of the flange $C^2$ and the rings $C^3$ and $C^5$, for these form the surface upon which the goods are carried, and we shall hereinafter designate in this specification this surface so made up as the "operative" surface of the cylinder C, and the surface exposed on either side of the folding-plate we will call the "exposed" operative surface. As only the margins of the goods lying on the exposed operative surface are to be operated upon by the radial presser $B^2$ and the operative ends of the folding-fingers $d$, it is necessary to provide a folding-plate over the operative surface of the cylinder C, when the operation upon the goods is performed, and over the edges of which the goods are folded. The folding-plate may be composed of two parts, E and E'. (Best seen in Figs. 5 and 9.) The part E is best made rigid, and is fastened to the bar I, which is held by means of two blocks, $i$, which blocks in turn are held by the bar H. The folding-plate at this part is made rigid by having a central rib, $E^2$. The portion E' of the folding-plate is flexible, and upon its outer surface the operative ends $d^3$ of the folding-fingers $d$ fold the edges of the goods, the central portion of the goods being between the operative surface of the cylinder C and the under surface of the folding-plate E'.

We prefer to make the folding-plate as shown; but a moving endless folding-band may be used, as described further on, and this we should consider as an equivalent construction.

At $b$ in Figs. 2, 4, and 5 are represented the guides through which the goods pass to the machine. The guides are shown as adapted for two strips; but more strips may be used, and the passage-ways through the guides may be multiplied. Inside of the frames A A are arranged two brackets, $a'$ $a'$, Fig. 2, which support the transverse bar H. This bar H is provided with a longitudinal slot $h$, Fig. 5. At the bottom of the guide $b$ is fixed a shoulder or support, $h'$, from which projects the screw-post $h^2$, carrying a thumb-screw, $h^3$, by means of which the guide $b$ is firmly held in position. The rotating cylinders B and C are suitably geared together, as shown in Fig. 1, and are operated by a hand-crank or by power from the pinion F. At the lower part of the machine there is a shaft, G, which carries upon it a presser-wheel, $G'$. The shaft is so geared that the peripheral speed of the wheel $G'$ is the same as that of the operative surface of the cylinder C, and with it it helps to feed the goods. This presser-wheel $G'$ is used for pressing the gum-cords $X^2$ upon the strips of fabric, the cords being shown in Figs. 10 and 12. The gum-cords are led from a spool placed in any convenient position. The cords are to be led from the spool through a bath of adhesive material in the well-known manner, and then passed to the guide $e$, Figs. 1, 3, and 5, fastened to the bar $e'$, which is in turn fastened to the frame of the machine. The cords pass through the eye $e^2$ of the guide $e$, and thence upon the periphery of the wheel G', which presses them upon the goods, to which they adhere. One, two, or more gum-cords may be used, and they may all pass through one eye, as shown, or there may be a series of eyes, the face of the wheel G' being made wider, if necessary. These gum-cords are used both for the purpose of ornament and for the purpose of giving more strength and solidity to the product.

We have not shown the steam-box, which is a device usually placed in machines of this general class, so as to deliver a jet or jets of steam or vapor upon the goods being operated upon, as such devices are well known in the art. The object of the steam or vapor is to soften the stiffening in the goods. The goods are then given the desired shape while the stiffening is pliable, and when the goods dry and cool the stiffening again hardens and the goods retain the shape given by the machine. The steam-box is fastened by the screw $f$ to to the bar $f'$, and this bar is fastened, as shown, to the frame of the machine.

No special description of the steam-box is necessary, as the device is of such common application that any mechanic will understand its method of use. The cylinders B and C are both heated by having gas burned in them, though other methods of heating may be used. Gas, however, is the method we prefer. In the machine shown the gas is led into the cylinder from a gas-pipe, J, through the trunnion $j$ of the cylinders, the gas-pipes within the cylinders being shown in dotted lines in Figs. 3 to 6 and in cross-section at $j^3$, Fig. 5. The air enters through the holes $j^2$ in the ends of the cylinders.

The operation of the machine is as follows: One, two, or more strips of goods, previously plaited or crimped, are led into the machine through the guides $b\ b$. As the strip or strips enter the machine, they pass from the guides $b\ b$ under the folding-plate E E', Fig. 5, and are underneath this folding-plate and between it and the operative surface of the cylinder C. The folding-fingers $d$ are, when the material meets them, held open, as in the lower part of Fig. 8, and the goods are upon and between the tops of the operative ends $d^3$ of the folding-fingers $d$. As the machine rotates and the goods advance with the moving parts, the portion $y'$ of the cam causes the fingers to close inward and downward till they reach the position shown in the upper part of Fig. 8. During this folding inward and downward of the fingers, portions of the goods are by the bottoms and ends of the fingers folded inward and downward upon the folding-plate E', as shown in Fig. 6, thus forming the part $X^4\ X^4$, Figs. 10, 11, and 12. The portions of the goods which are between the fingers are kept down and toward the exposed operative surface to the desired degree by the radial pressers $B^2\ B^2$, which, operating between the fingers, press the goods between them upon or toward the exposed operative surface of the cylinder C, in this way insuring that part of the formation which is represented in Figs. 10, 11, and 12 at $X^3\ X^3$. The goods thus pass along in the machine, moving with the rotating parts thereof, as shown in Fig. 6, until they issue from under the folding-plate E', and almost immediately the fingers go into that part of the cam D marked $y^2$. The fingers then again open, as in the lower part of Fig. 8, and they lose control of the goods, which still lie upon the operative surface of the cylinder C, pass between it and the roller G', where the gum-threads are applied, after which they issue in the direction of the arrow Z, Fig. 5, completed so far as this mechanism is concerned, the goods being in the condition shown in Figs. 10, 11, and 12. Both the under surface of the portion $d^3$ of the folding-fingers, as well as the ends of the fingers, assist in the formation of the goods, folding over upon E' portions of the margins exposed on each side of the folding-plate E', while the radial pressers, acting upon the goods between the fingers, prevent undue folding by the fingers and define and make even the resulting folds. If the pivots $c^4$ of the folding-fingers are in the hole $d'$, as shown, then there will be less folding of the goods than if the pivots $c^4$ are in the hole $d^2$, for in the latter event the fingers will approach each other from opposite sides nearer. The folding-fingers are shown as of the best shape; but various other shapes may be adopted as circumstances may suggest, the gist of the invention in this regard lying in having the folding-fingers open away from and close in toward the operative surface of the cylinder C under the control of a suitable cam or equivalent controlling means.

The spring folding-plate E E' might be replaced by an endless tape traveling around part of the operative surface of the cylinder C and around the wheels properly located back of the cylinder, the gist of the invention in this regard lying in having a holding device, against the edge of which and over upon which the goods may be folded, and a very highly-stretched endless tape of steel or other suitable material might be used.

Fig. 13 illustrates a method of using a stretched endless tape, preferably of steel, in place of the spring folding-plate. In this drawing, 1 is an endless ribbon, preferably of steel, which passes around the rollers 2, 3, 4, and 5. The goods pass in through the guide $b$ under the tape and between it and the operative surface of the cylinder C, and the margins of the goods lying upon the exposed operative surface are folded over upon the upper surface of the traveling endless tape. It is best to gear one of the rollers—say the roller 2—so as to drive the tape at the same speed as the operative surface of the cylinder C.

In using the stretched endless tape in place of the folding-plate, should the goods be apt to run between the tape and roller upon which it is stretched, guides can be used to obviate the difficulty. Such guides being common in the art and known to every mechanic, it consequently is not necessary to further describe or illustrate them. We have omitted all letters of reference on Fig. 13, except those used in the description of this particular construction, for the purpose of more clearly describing it.

It is not essential to our invention that the precise method of hinging the fingers should be adopted. Many ways will present themselves to a mechanic for effecting like results with fingers differently hinged. The radial pressers $B^2$ may be arranged in many different ways, though we have shown, we think, the simplest form in the drawings. So long as the pressers serve to press or hold down the goods between the folding-fingers $d$ in substantially the way shown, they would come within our invention in this regard, for we do not mean to limit ourselves to the particular form of radial pressers here shown. The cylinder B and the roller G', with its shaft G, are best made adjustable in their bearings, either by spring adjustments or by nuts, for the degree of pressure of those parts upon the goods requires to be varying to suit different thicknesses of goods and different styles of folds. By suitably adjusting the width of the strip fed in and the position of the guides $b\ b$ laterally, a strip may be folded upon one margin only—that is to say, one half of our machine is capable of producing useful results and ornamental effects upon the goods upon one margin thereof as well as upon both.

The device shown in Fig. 13 and described in the body of the specification—viz., the flexible endless folding-plate—is not claimed in this application, but will form the subject-matter of a subsequent application.

What we claim, and desire to secure by Letters Patent, is—

1. In a machine for ornamenting a strip of fabric, the combination, with one or more sets of pivoted folding-fingers pivoted to and carried by a rotating cylinder, of one or more sets of intermittent pressing devices so arranged in relation to the fingers that they press upon alternate portions of the margin or margins of the goods between the said folding-fingers, substantially as described.

2. In a machine for ornamenting a strip of fabric, the combination of a rotating cylinder having a cylindrical operative surface, pivoted folding-fingers carried by said cylinder, a cam adapted to control the position of the said folding-fingers, and a folding-plate separate from but conforming to the shape of said operative surface, substantially as described.

3. In a machine for ornamenting a strip of fabric, the combination of a set or sets of folding-fingers pivoted to the rotating cylinder, a cam adapted to control the position of the folding-fingers, and a folding-plate separate from but conforming to the shape of the said cylinder, over the edge or edges of which the margin or margins of the strip is folded by the folding fingers, substantially as described.

4. In a machine for ornamenting a strip of fabric, the combination of a set or sets of folding-fingers pivoted to a rotating cylinder, a folding-plate separate from but conforming to the curved surface of the cylinder, the said cylinder and plate being so arranged in respect to each other that the unfolded portion of the goods lies between the plate and the cylinder, while the portion to be folded lies upon one or both sides of the folding-plate, and a cam or cams adapted to control the position of the fingers, and so placed that they fold the free margin or margins of the goods upon the surface of the folding-plate, substantially as described.

5. The combination, in a machine for ornamenting a strip of fabric, of a rotating cylinder, a set or sets of folding fingers moving with the cylinder, a cam or cams to operate the folding-fingers and to cause them to fold the margin or margins of a strip of fabric, a folding-plate suitably arranged, and over the edge or edges of which the fabric is folded, and rotating radial pressers acting upon the strip between the folding-fingers, substantially as described.

6. In a machine for ornamenting a strip of fabric, the combination of a set of pivoted folding-fingers and a rotating cylinder carrying the said fingers, pivots upon which the said fingers can turn, rings $C^3\ C^5$, for holding the pivots of the fingers, and a central enlarged portion, $C^2$, formed upon the cylinder, to which the fingers are pivoted, substantially as described.

7. For use in combination with a machine for ornamenting a strip of fabric, folding-fingers having three extensions, one to operate upon the fabric, the other to move within a cam-groove, and a third adapted to receive the pivots of the fingers, the said first and third extensions being formed at adjacent portions of the fingers, substantially as described.

8. In a machine for ornamenting a strip of fabric, the combination of slotted grooved rings forming part of an operative surface, folding-fingers, said fingers having three extensions, one to operate upon the fabric, another to move within a cam-groove, and a third adapted to receive the pivots of the fingers, pivots for the folding-fingers carried by the slotted grooved rings, said pivots being below the operative surface formed by the rings, and means for vibrating the said fingers, substantially as described.

9. In a machine for ornamenting a strip of fabric, the combination of a rotating cylinder, radial slots formed in the said cylinder, an unbroken cylindrical operative surface formed by the parts composing said rotating cylinder, fingers pivoted within the slots in the said cylinder, and a folding-plate separate from but conforming to the operative surface of the cylinder, and a cam or cams for controlling the position of the fingers in relation to the operative surface and the folding-plate, substantially as described.

10. In a machine for ornamenting a strip of fabric, the combination of a cylinder having an operative surface, a folding-plate adapted to such surface but of less width than the surface, fingers arranged at their operative ends to close upon or toward the exposed operative surface and folding-plate, means for operating the said fingers, and a presser or pressers which act upon the goods between the fingers and press them upon or toward the exposed operative surface on each side of the folding-plate, substantially as described.

11. The combination, with the fingers $d\ d$, having three extensions, one of which forms the operative ends $d^3\ d^3$, another containing the holes $d'\ d^2$, for the purpose of altering the relation of the fingers, and another to move within a cam-groove, of means for vibrating the said fingers, substantially as described.

12. In a machine for ornamenting a strip of fabric, a rotating cylinder having an operative surface and a stationary folding-plate adapted thereto, combined with folding instrumentalities which rotate with the cylinder and fold the margin or margins of the goods as the goods pass with the cylinder under the folding-plate, substantially as described.

13. In a machine for ornamenting a strip of fabric, a folding-plate made rigid at the end and which is fastened or attached to the frame of the machine, and flexible at the other end, where it is bent to conform to the operative surface, with which it co-operates, and an operative surface, and one or more sets of folding-fingers, adapted to fold the material over and upon said folding-plate, substantially as described.

GEO. TAYLOR.
J. H. TAYLOR.

Witnesses:
ALFRED J. FIELD,
GEO. G. SEWARD.